(12) United States Patent
Wheelington

(10) Patent No.: US 10,582,704 B2
(45) Date of Patent: Mar. 10, 2020

(54) SWINGDOWN TREESTAND AND STICK SYSTEM

(71) Applicant: Advanced Treestand Investments, LLC, Smackover, AR (US)

(72) Inventor: Ryan S. Wheelington, Louann, AR (US)

(73) Assignee: Advanced Treestand Investments, LLC, Smackover, AR (US)

( * ) Notice: Subject to any disclaimer, the term of this patent is extended or adjusted under 35 U.S.C. 154(b) by 37 days.

(21) Appl. No.: 15/866,114

(22) Filed: Jan. 9, 2018

(65) Prior Publication Data
US 2018/0192635 A1    Jul. 12, 2018

Related U.S. Application Data

(60) Provisional application No. 62/443,862, filed on Jan. 9, 2017.

(51) Int. Cl.
*A01M 31/02*    (2006.01)
(52) U.S. Cl.
CPC .................. *A01M 31/02* (2013.01)
(58) Field of Classification Search
CPC .... A01M 31/00; A01M 31/02; A01M 31/025; A45F 3/26
See application file for complete search history.

(56) References Cited

U.S. PATENT DOCUMENTS

| | | | | |
|---|---|---|---|---|
| 4,782,918 A * | 11/1988 | Brunner | ................ | A01M 31/02 108/152 |
| 5,040,635 A * | 8/1991 | Strickland | ................ | E06C 1/34 182/100 |
| 5,363,941 A * | 11/1994 | Richard | ................ | A01M 31/02 108/152 |
| 5,409,083 A * | 4/1995 | Thompson | ............ | A01M 31/02 108/152 |
| 5,469,934 A * | 11/1995 | Pherigo | ................ | A01M 31/02 108/152 |
| 5,538,101 A * | 7/1996 | Kempf | .................. | A01M 31/02 182/116 |
| 5,562,180 A * | 10/1996 | Herzog | ................ | A01M 31/02 108/152 |
| 6,085,868 A * | 7/2000 | Anthony | ............... | A01M 31/02 108/152 |
| 6,102,158 A * | 8/2000 | Winschel | .............. | A01M 31/02 182/187 |
| D444,573 S * | 7/2001 | Owens | ......................... | D25/62 |
| 6,336,520 B1 * | 1/2002 | Amacker | .............. | A01M 31/02 182/135 |
| 6,367,585 B1 * | 4/2002 | Fast | ...................... | A01M 31/02 182/135 |

(Continued)

*Primary Examiner* — Katherine W Mitchell
*Assistant Examiner* — Shiref M Mekhaeil
(74) *Attorney, Agent, or Firm* — Brown & Michaels, PC

(57) ABSTRACT

The tree stand and climbing stick system of an embodiment of the present invention allows for a user to assemble sticks, install onto a tree, then use a swing-arm on the sticks, as an improved means for safely and securely installing your tree stand while in the tree. The stand has a simple female receiver which installs on a male fitting on the swing-arm. Once installed on the swing-arm, the user can then have both hands free to connect the straps to the tree. No one has used climbing sticks as a method to improve the user experience for hanging a lock on tree stand.

8 Claims, 15 Drawing Sheets

(56) References Cited

U.S. PATENT DOCUMENTS

| | | | | |
|---|---|---|---|---|
| 6,386,321 B1 * | 5/2002 | Muhich | A01M 31/02 | 182/135 |
| 6,547,035 B1 * | 4/2003 | D'Acquisto | A01M 31/00 | 182/100 |
| 6,722,472 B2 * | 4/2004 | Berkbuegler | A01M 31/02 | 108/152 |
| 7,377,361 B1 * | 5/2008 | Tschida | A01M 31/02 | 182/187 |
| 7,434,662 B2 * | 10/2008 | McFall | A01M 31/02 | 182/133 |
| 7,926,775 B1 * | 4/2011 | Milazzo | A01M 31/02 | 248/230.8 |
| 8,272,479 B1 * | 9/2012 | Leach | A01M 31/02 | 182/128 |
| D725,292 S * | 3/2015 | Wheelington | D25/62 | |
| 9,057,202 B2 * | 6/2015 | Berkbuegler | E04G 3/00 | |
| 9,089,125 B1 * | 7/2015 | Fast | E04G 3/24 | |
| 9,151,112 B2 * | 10/2015 | Niemela | E06C 1/04 | |
| 9,631,428 B2 * | 4/2017 | Niemela | E06C 7/188 | |
| 9,986,732 B1 * | 6/2018 | Pope | A01M 31/02 | |
| 2005/0039985 A1 * | 2/2005 | Butterworth | A01M 31/02 | 182/187 |
| 2008/0196972 A1 * | 8/2008 | Bell | E06C 1/34 | 182/92 |
| 2014/0008149 A1 * | 1/2014 | Fogel | A01M 31/02 | 182/129 |
| 2014/0138185 A1 * | 5/2014 | Samona | A01M 31/02 | 182/187 |
| 2014/0190767 A1 * | 7/2014 | Wheelington | A01M 31/02 | 182/129 |
| 2015/0042132 A1 * | 2/2015 | Weber, Jr. | A47C 4/028 | 297/188.2 |
| 2015/0053503 A1 * | 2/2015 | Richey | A01M 31/02 | 182/187 |
| 2015/0196806 A1 * | 7/2015 | Wakefield, Jr. | A63B 27/02 | 182/187 |
| 2016/0069133 A1 * | 3/2016 | Priest | E06C 1/381 | 182/189 |
| 2018/0192634 A1 * | 7/2018 | Check | A01M 31/02 | |
| 2018/0310547 A1 * | 11/2018 | McCharles | A45F 3/26 | |
| 2019/0055782 A1 * | 2/2019 | Infalt | E06C 1/34 | |

* cited by examiner

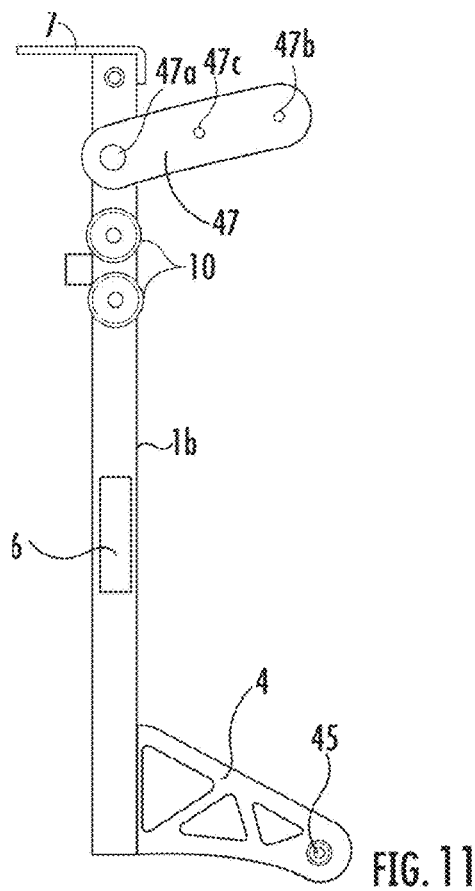
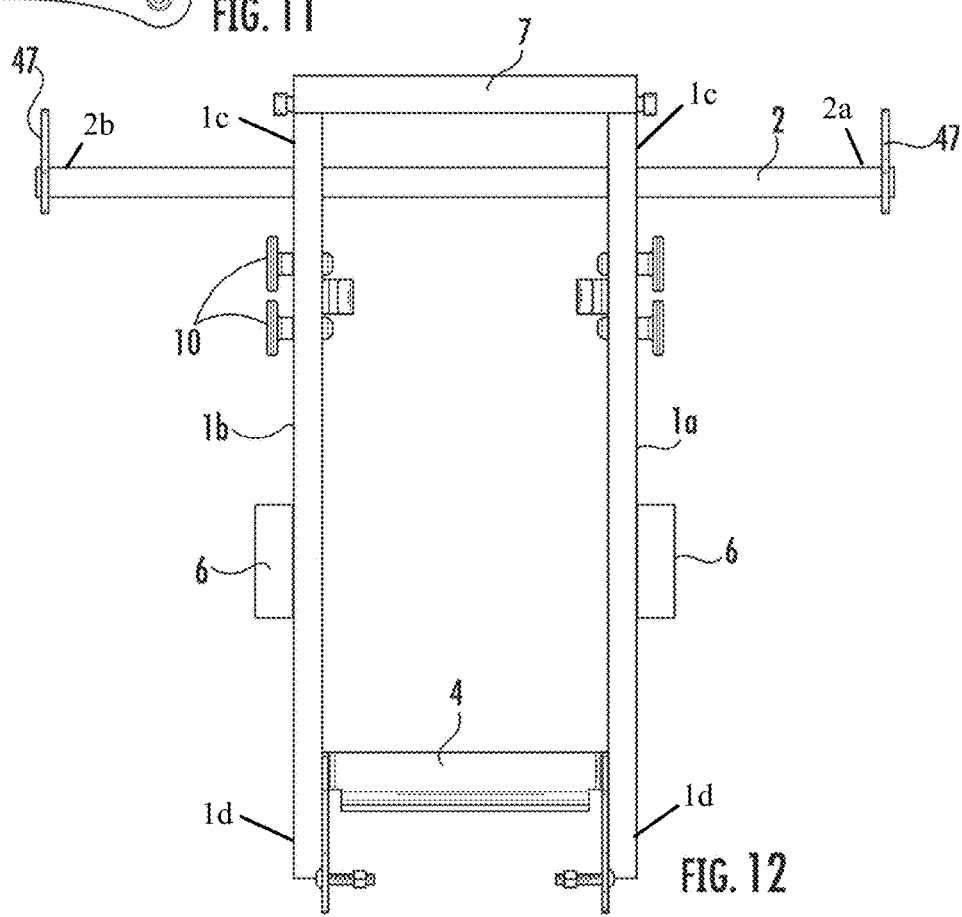

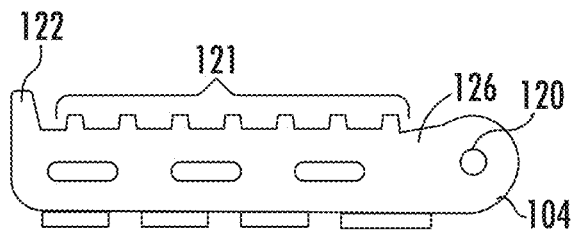
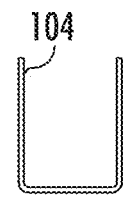
FIG. 18A  FIG. 18B
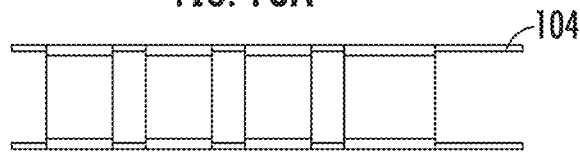
FIG. 18C
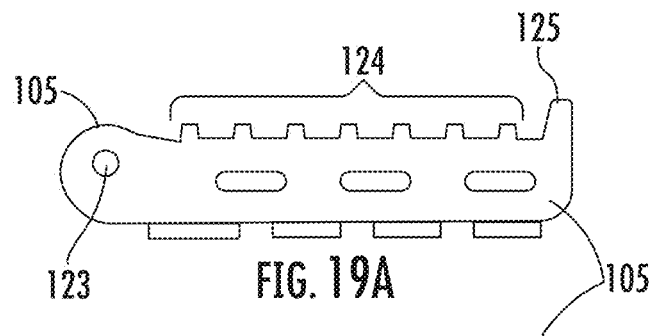
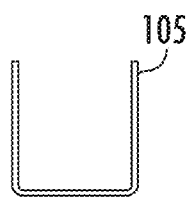
FIG. 19A  FIG. 19B
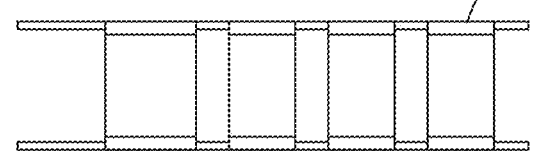
FIG. 19C

SWINGDOWN TREESTAND AND STICK SYSTEM

REFERENCE TO RELATED APPLICATIONS

This application claims one or more inventions which were disclosed in Provisional Application No. 62/443,862, filed Jan. 9, 2017, entitled "SWINGDOWN TREESTAND AND STICK SYSTEM". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of tree stands. More particularly, the invention pertains to a swing-down tree stand and stick system.

Description of Related Art

Attaching tree stands to trees can prove to be difficult for hunters. Currently, tree stands are attached by one of the following methods:

1) Held in position by the hunter while trying to secure straps. Holding the tree stand and installing straps at the same time can prove to be dangerous and frustrating for the user.

2) Strapping a stand-alone receiver bracket to the tree to allow the stand to slide into position; or 3) Using ropes and pulleys to hold the stand in position.

Additionally, there are tree stands which are attached to the tree in sections, in which the sections are attached independently and then connected together.

SUMMARY OF THE INVENTION

In one embodiment of the present invention, a pivot bracket for a lower platform of a tree stand has a pivot point which is forward or away from a tree connection point. This arrangement removes the "trap door" which can occur if a user is standing on the lower platform of the tree stand when the cables connecting the lower platform to the support rails of the tree stand or the tree itself snap, causing the lower platform to move from a horizontal position to a vertical position. The "trap door" could potentially cause the user to fall from the tree stand.

If the cables were to break in this embodiment of the present invention, the pivot bracket supports the lower platform, protecting the user of the tree stand. The pivot bracket of an embodiment of the present invention may be used with any hang-on tree stand.

The tree stand and climbing stick system of an embodiment of the present invention allows a user to assemble sticks, install the sticks onto a tree, then use a swing-arm on the sticks as an improved means for safely and securely installing the tree stand while in the tree.

The stand has a simple female receiver which installs on a male fitting on the swing-arm. Once installed on the swing-arm, the user can then have both hands free to connect the straps to the tree.

This system can be sold as an accessory that can be added to any traditional hang-on tree stand and stick, or to any other tree stand which attaches pieces independently to the tree.

Furthermore, most basic hang-on tree stands don't have the ability to adjust the platform angle without requiring the use of tools or adjustment knobs. An embodiment of the present invention allows for a safe, silent, and quick method for changing the pitch of the platform by placing adjustment tabs on the upright vertical support of a Swing-Down Tree stand.

BRIEF DESCRIPTION OF THE DRAWING

FIG. 11 shows a side view of the tubular bracket of the tree stand with the platform pivot bracket.

FIG. 12 shows a front view of the tubular bracket of the tree stand with the platform pivot bracket.

FIG. 18*a* shows a front view of swing-up step of an embodiment.

FIG. 18*b* shows a side view of swing-up step of an embodiment.

FIG. 18*c* shows a bottom view of a swing-up step of an embodiment.

FIG. 19*a* shows a front view of a swing-up step of an alternate embodiment.

FIG. 19*b* shows a side view of a swing-up step of an alternate embodiment.

FIG. 19*c* shows a bottom view of a swing-up step of an alternate embodiment.

DETAILED DESCRIPTION OF THE INVENTION

Figure 1:
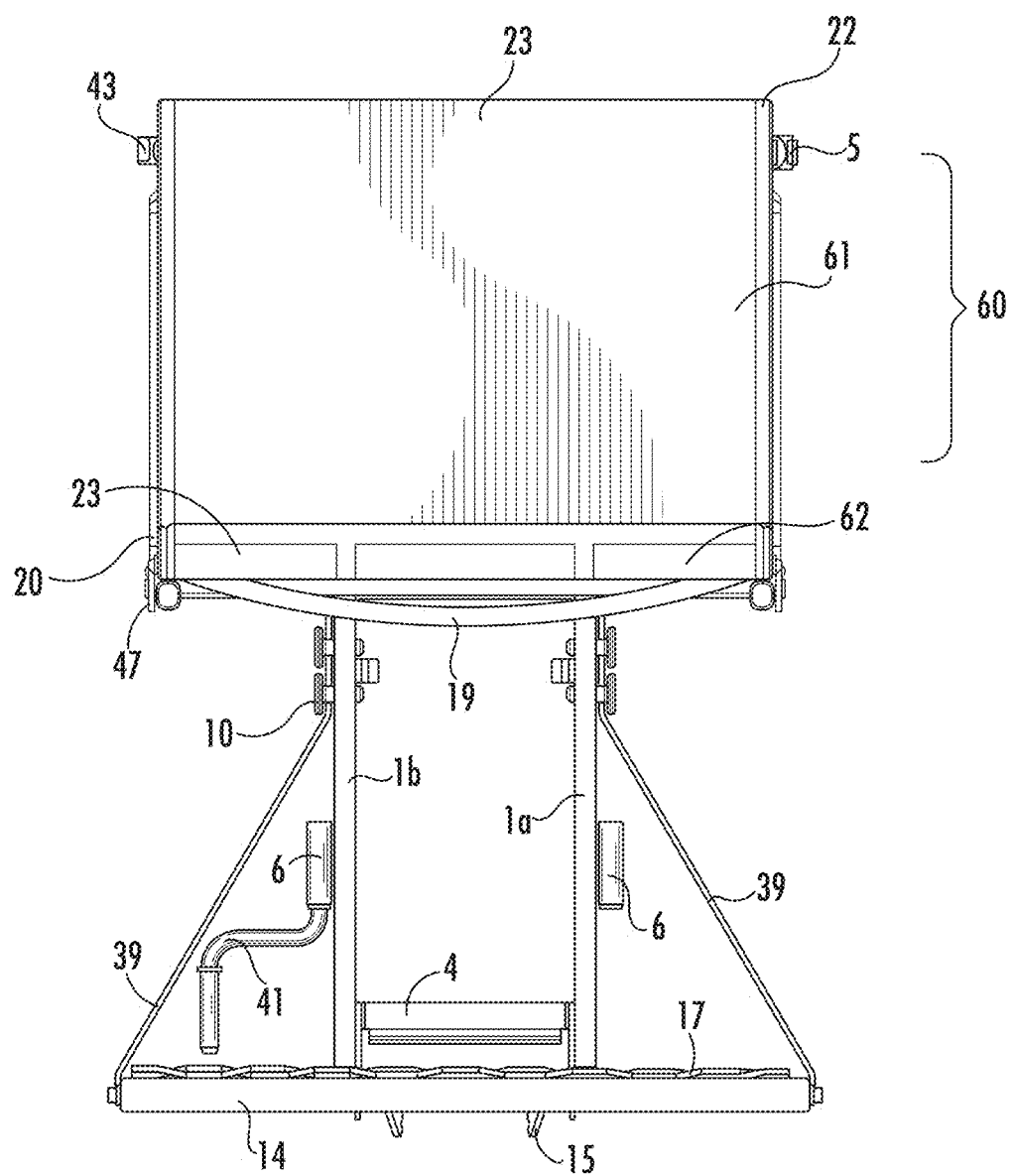
FIG. 1 shows a front view of a tree stand with the swing arm of an embodiment of the present invention.
Figure 2:
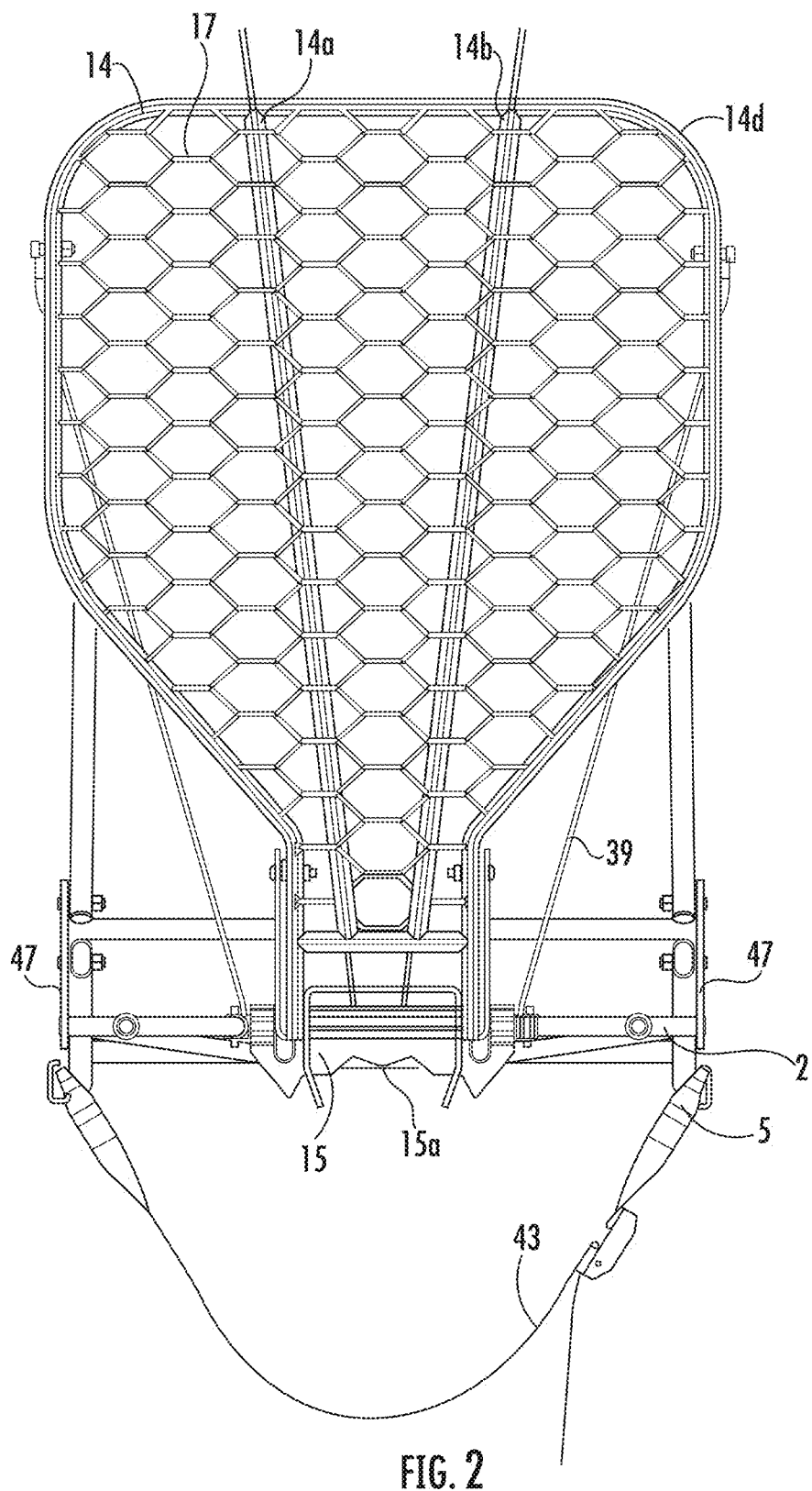
FIG. 2 shows a bottom view of a tree stand with the swing arm of an embodiment of the present invention.
Figure 3:
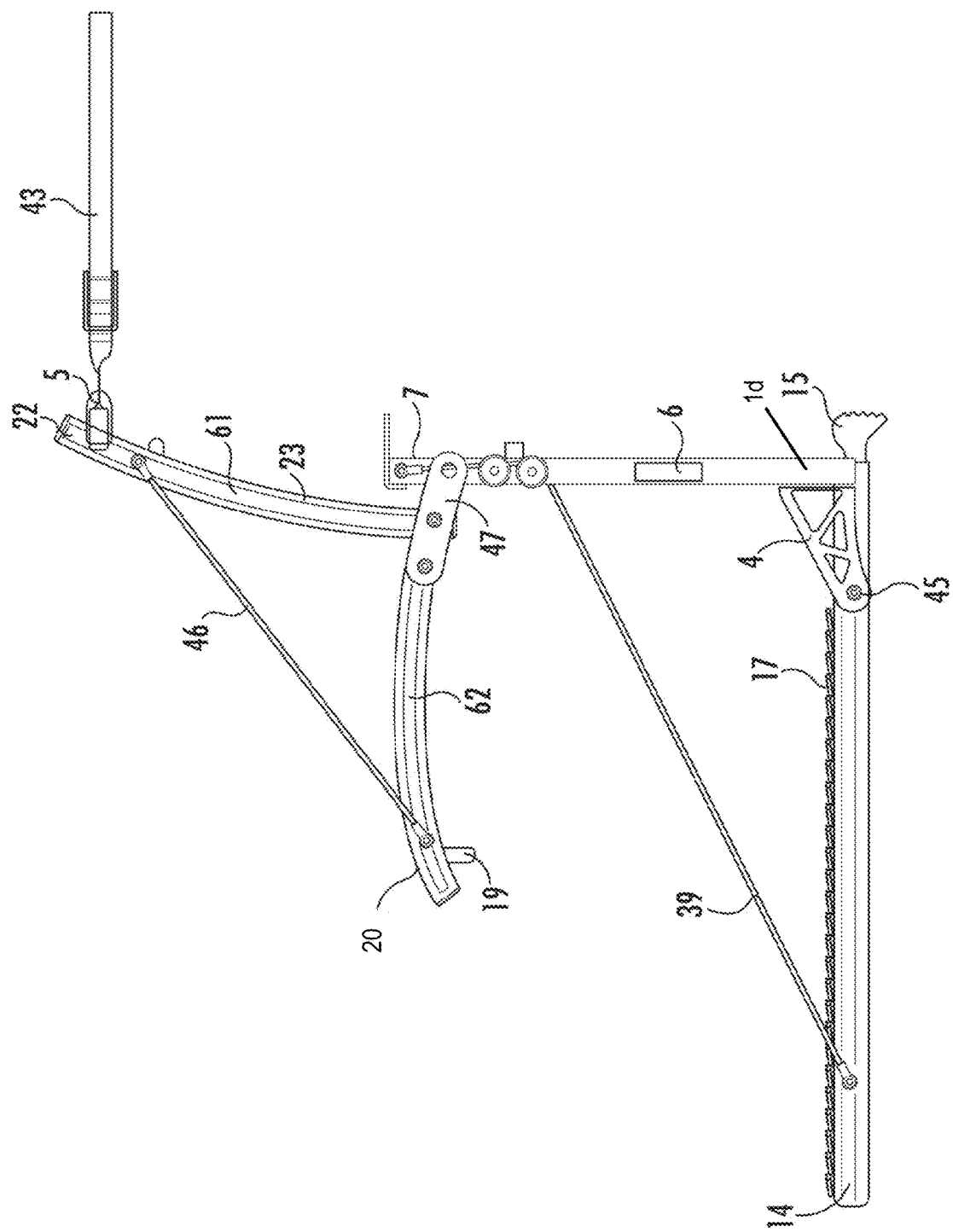
FIG. 3 shows a side view of a tree stand with the swing arm of an embodiment of the present invention.
Figure 4:
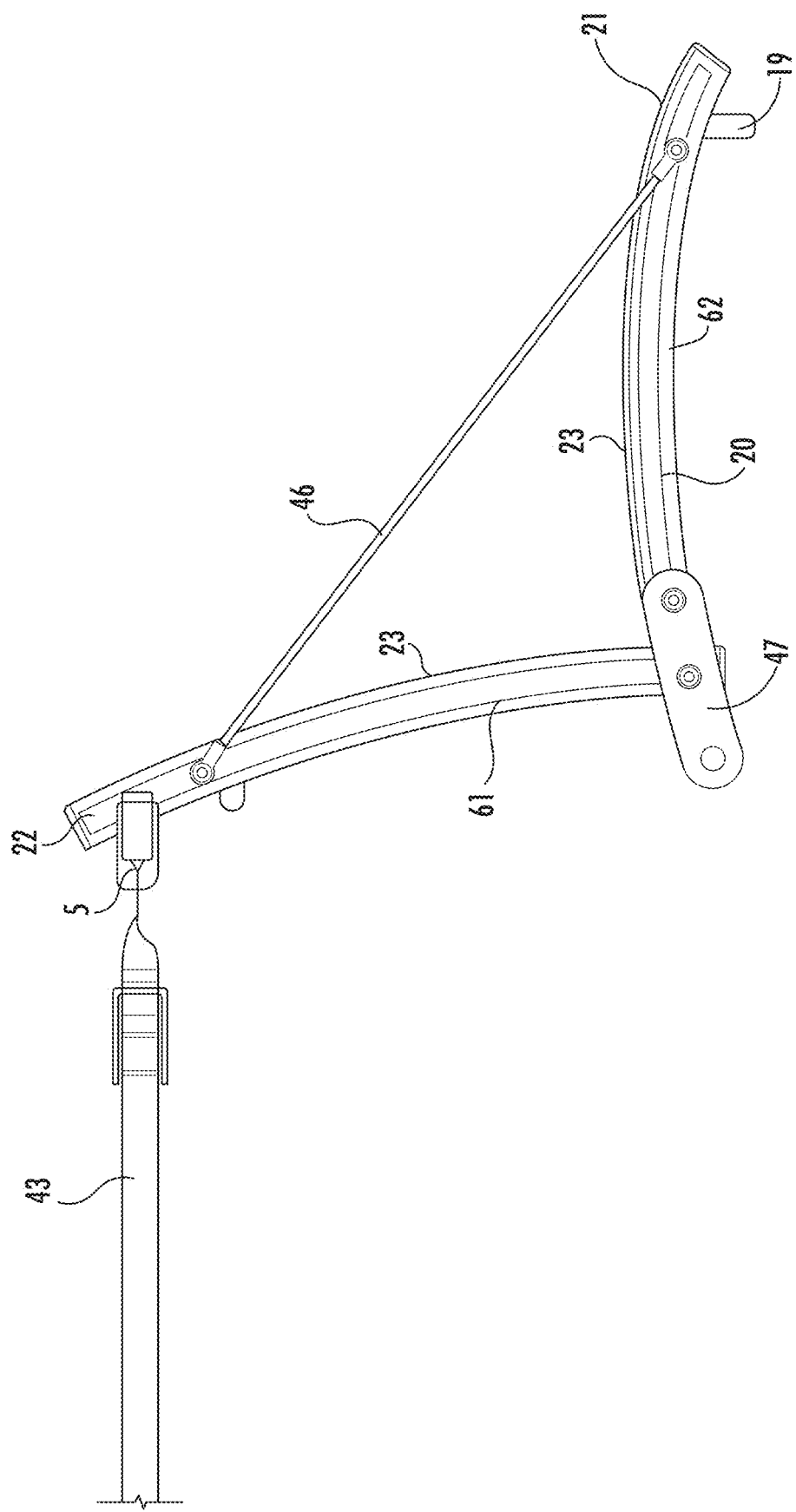
FIG. 4 shows a side view of the seat of the tree stand.
Figure 5:
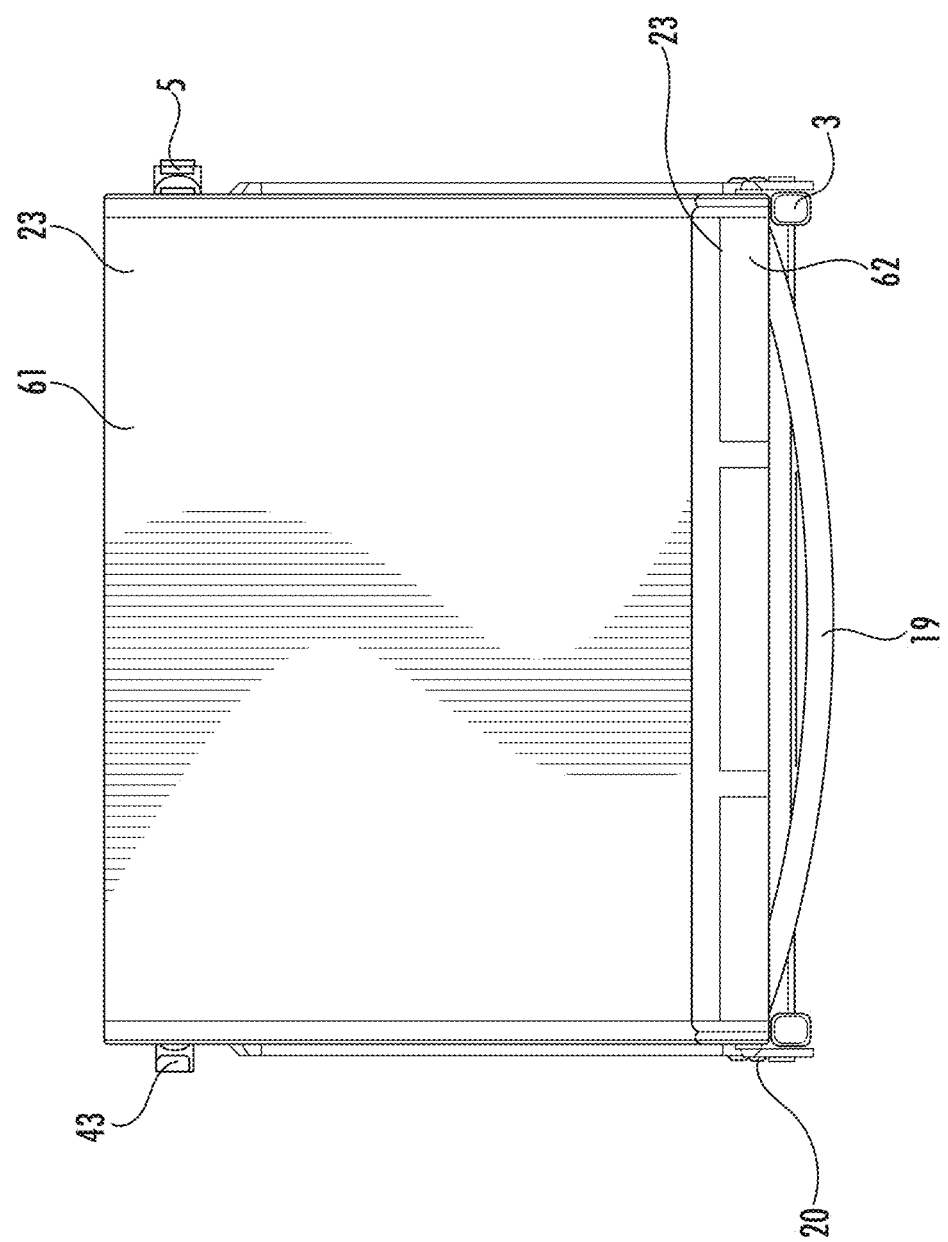
FIG. 5 shows a front view of the seat of the tree stand.
Figure 6:
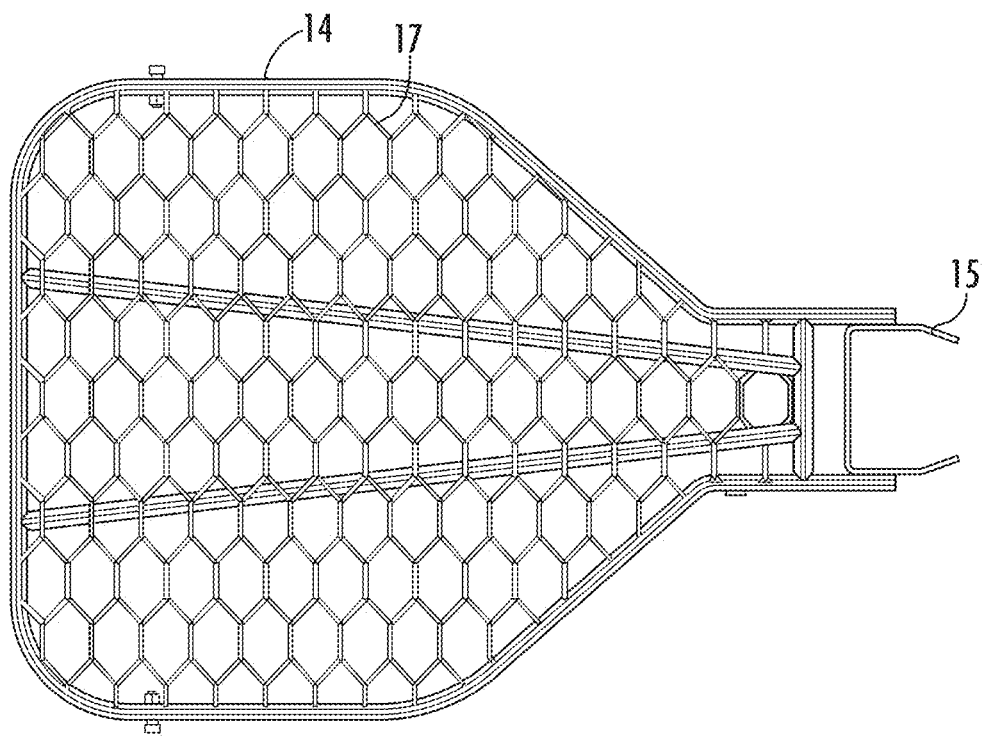
FIG. 6 shows a top view of the mesh platform of the tree stand.
Figure 7:
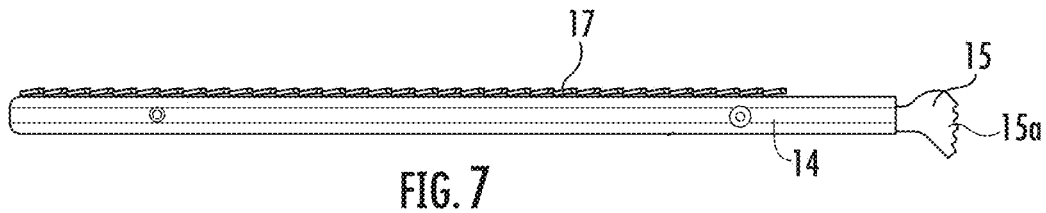
FIG. 7 shows a side view of the mesh platform of the tree stand.
Figure 8:
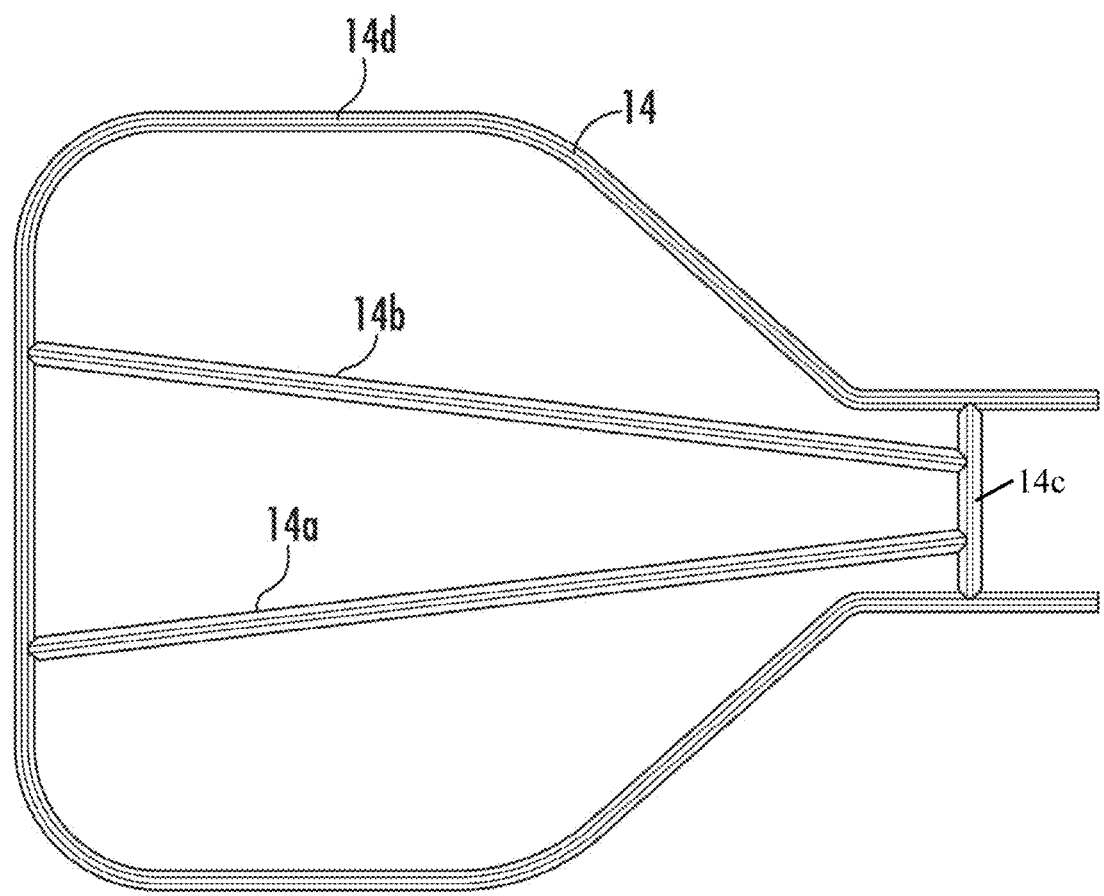
FIG. 8 shows a top view of the platform of the tree stand with the mesh removed.
Figure 9:
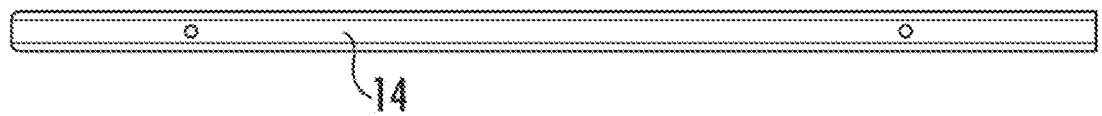
FIG. 9 shows a side view of the platform of the tree stand with mesh removed.
Figure 10A:
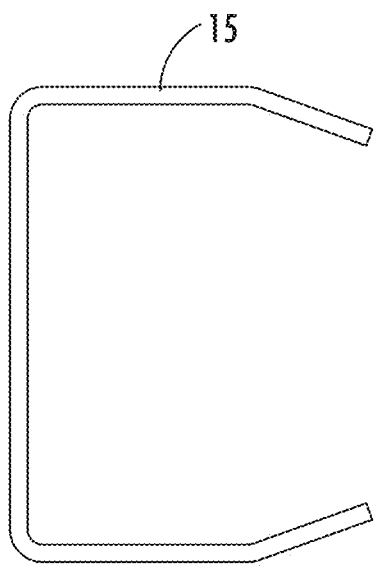
FIG. 10*a* shows a top view of the cam plate of the tree stand.
Figure 10B:
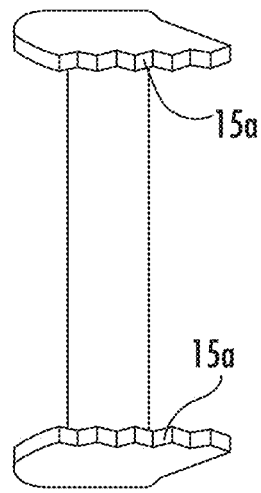
FIG. 10*b* shows a front view of the cam plate of the tree stand.
Figure 10C:
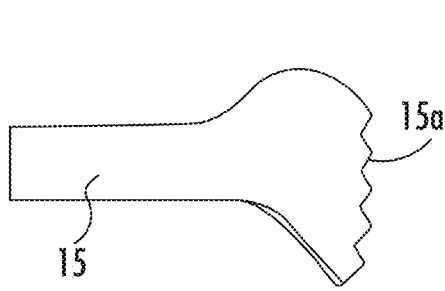
FIG. 10*c* shows a side view of the cam plate of the tree stand.
Figure 10D:
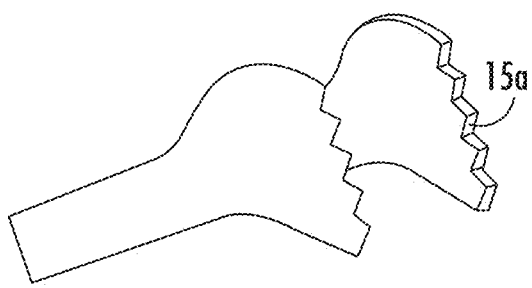
FIG. 10*d* shows a perspective view of the cam plate of the tree stand.
Figure 13A:
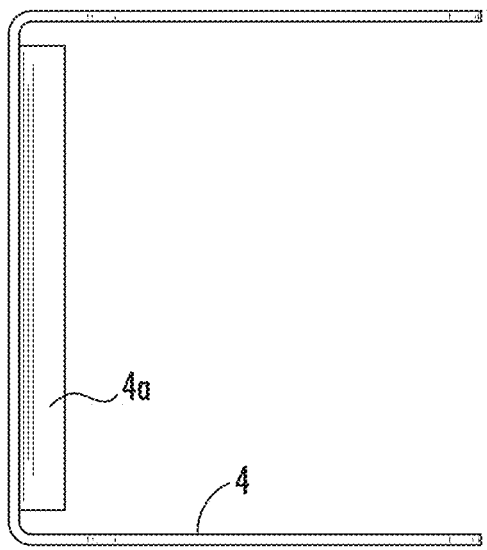
FIG. 13*a* shows a top view of the platform pivot bracket.
Figure 13B:
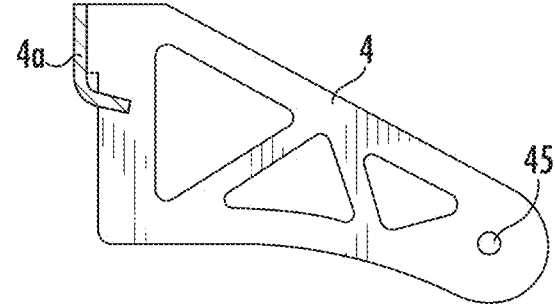
FIG. 13*b* shows a side view of the platform pivot bracket.
Figure 13C:
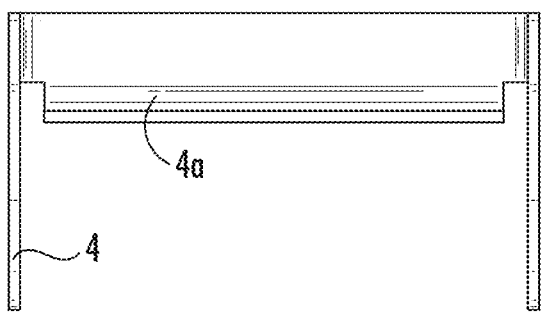
FIG. 13*c* show a bottom view of the platform pivot bracket.
Figure 14A:
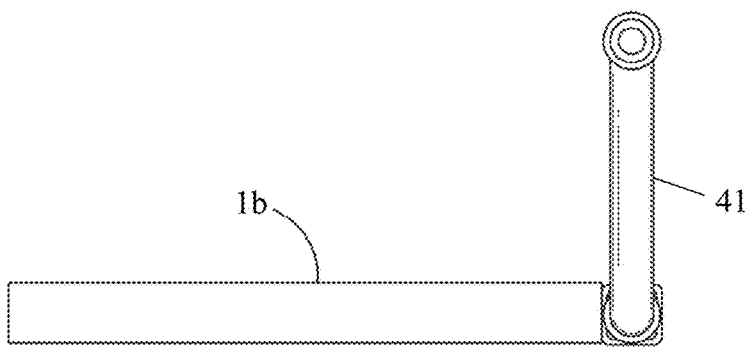
FIG. 14*a* shows a side view of a swing arm.
Figure 14B:
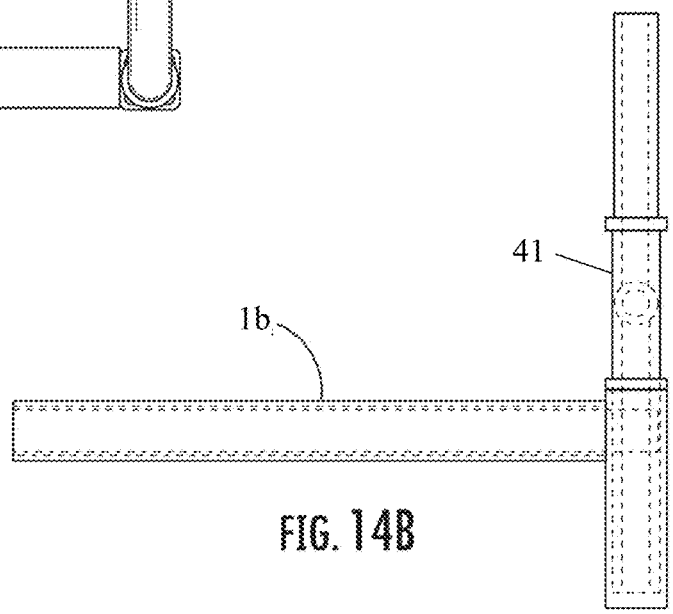
FIG. 14*b* shows a bottom view of a swing arm.
Figure 14C:
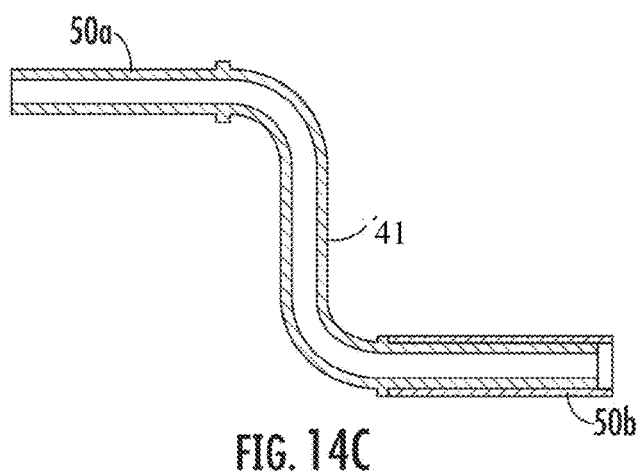
FIG. 14*c* shows a sectional view along D-D of FIG. 14*a* of a swing arm.
Figure 14D:
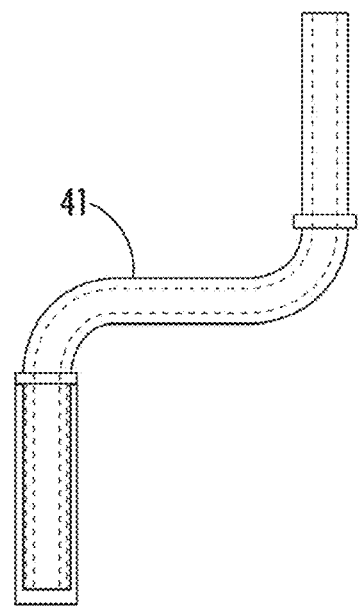
FIG. 14*d* shows a front view of a swing arm.
Figure 15:
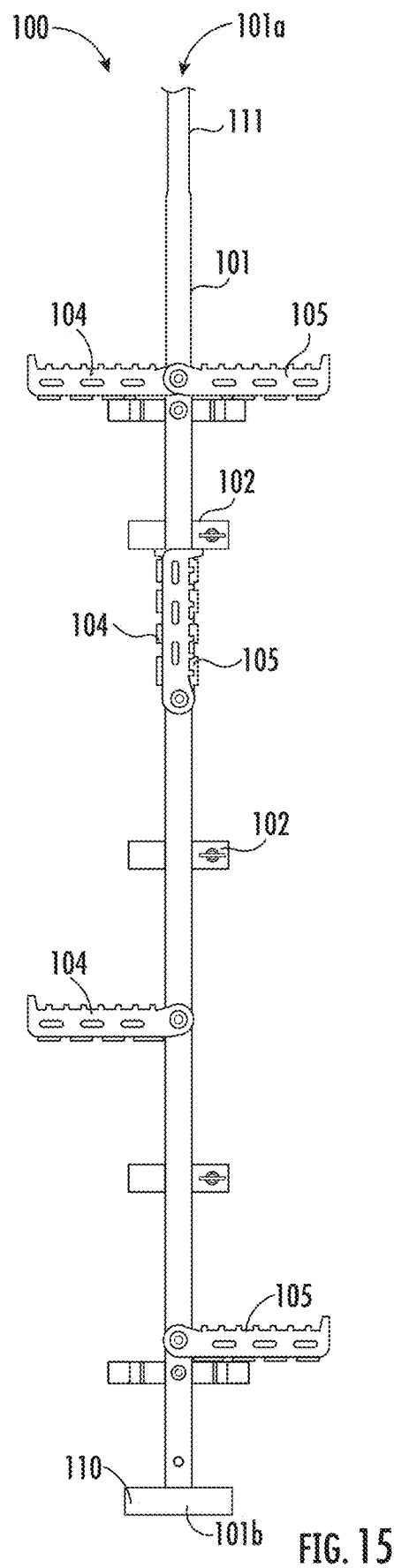
FIG. 15 shows a front view of the climbing stick.
Figure 16:
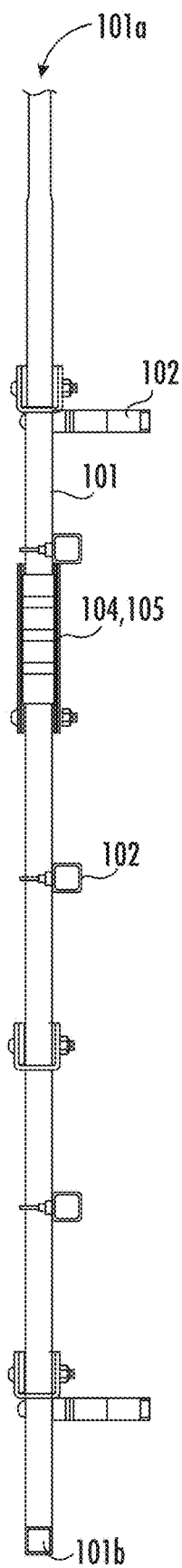
FIG. 16 shows a back view of the climbing stick.

FIGS. 1-14d shows a tree stand and various components of a tree stand of an embodiment of the present invention. FIGS. 15-20d show a climbing stick of an embodiment of the present invention which can be used with the installation of the tree stand of FIGS. 1-14d.

Referring to FIGS. 8-12, first tubular bracket 1a and second tubular bracket 1b are connected together at a first end 1c through a top tree bracket 7 and a second end 1d through a platform bracket 4 which engages a lower platform 14. A pivot cross tube support 2 is rotatably received by the first and second tubular brackets 1a, 1b. The pivot cross tube support 2 has a first end 2a and a second end 2b. On each end 2a, 2b of the pivot cross tube support 2 is a pivot support bracket 47.

Along the length of the first and second tubular brackets 1a, 1b are sleeve supports 6 for receiving a swing arm 41, a series of knobs 10 for adjusting tension on cables 39 connected to the lower platform 14, and a strap terminal bracket 5. By placing the cables 39 around the adjustment knobs 10, the diagonal length of the cable can be changed, raising and lowering the pitch of the platform. The series of knobs 10 provide a tool-less platform pitch adjustment which is noiseless and allows for adjustment of the pitch of the platform on crooked trees.

The swing arm 41 is shown in FIGS. 14a-14d. The swing-arm 41 allows for the safe and secure installation of a tree stand in a tree. The swing-arm 41 allows the user a means to temporarily place the tree stand, without supporting the tree stand's weight, while installing the final attachment straps and or cables 43. The swing-arm 41 can be of welded, cast, or extruded construction. An additional strand strap attachment point 51 may be located between on the first tubular bracket 1a and second tubular bracket 1b between the adjustment knobs 10.

The swing-arm 41 has a male fitting 50a, 50b on each end which mates with a female receiver 111 on climbing stick 100 shown in FIGS. 15-20d, and also with a female receiver on sleeve support 6 on tubular brackets 1a, 1b of the tree stand as shown in FIGS. 11-12. An additional tube extender 54 may be present on the male fitting 50a between the swing arm 41 and the female receiver 111 of the climbing stick to add length between the tree stand and the climbing stick 100.

The pivot support bracket 47 has a pivot hole 47a, an end hole 47b and a middle hole 47c located between the pivot hole 47a and the end hole 47b. The middle hole 47c receives a fastener for coupling the pivot support bracket 47 to a first end of a back extrusion rail 22.

Referring to FIGS. 1, 3, 4 and 5, the second end of the back extrusion rail 22 is coupled to an adjustable strap 43 with brackets and clamps 5 for attaching the tree stand to a tree. The end hole 47b in pivot support bracket 47 receives a fastener for coupling the pivot support bracket 47 to a seat extrusion rail 20. Fabric 23 can be stretched between back extrusion rails 22 to form a back 61 of a seat 60 and stretched between seat extension rails 20 to form a bottom portion 62 of a seat 60. A tube tie bar 19 may also extend between seat extension rails 20 to provide additional support to the seat bottom 62. To provide extra support to the seat 60, cables 46 additionally connect the back extrusion rails 22 to the seat extension rails 20.

Referring to FIGS. 1-3, 6-9 and 13a-13c, a lower platform 14 comprising an outside support rail 14d with multiple cross support bars 14a-14c is pivotably connected to platform pivot bracket 4 through pivot point 45. The pivot point 45 of the platform pivot bracket 4 is forward of the first and second tube brackets 1a, 1b and any attachment point of the tree stand to a tree. An end of the platform pivot bracket 4 adjacent the tree contains a bent edge 4a which can interface with the outside support rail 14d of the lower platform 14. The lower platform 14 preferably has a metal grate 17 on which a user of the tree stand can stand, or on which the user can place their feet on when sitting. The metal grate 17 may be replaced with extruded tubing or cast metal.

By moving the pivot point 45 forward, in the event that cables 39 broke, bent edge 4a of the platform pivot bracket 4 acts as a cantilever for the outside support rail 14d of the lower platform 14. The platform pivot bracket 4 eliminates the "trap door" from occurring, increasing the safety of the tree stand for a user. The position of the pivot point 45 may vary from the position shown, but is forward of the first and second tube brackets 1a, 1b at least a distance, which can vary depending on properties of the material of the bracket and the platform used as well as the factor of safety desired.

A cam plate 15 is coupled to the lower platform 14. The cam plate 15, as shown in FIGS. 10a-10d, is C-shaped with each of the ends of the C having a series of teeth 15a. The teeth 15a are used to position, grip and lock the lower platform 14 into place on a tree through cam lock force relative to the tree.

A climbing stick 100 is shown in FIGS. 15-21d. The climbing stick 100 may be made of square tubing, stamped steel or stamped aluminum. The climbing stick 100 has a stem section 101 extending a length with a first end 101a with a female receiver 111 and a second end 101a with a foot 110. The foot 110 is removable so that the female receiver 111 of a first end 101a can be received by the second end 101b of the climbing stick, stacking climbing sticks. The length of the climbing stick 100 is preferably 16 to 21 feet. Between the foot 110 and the female receiver 111 are a series of rotatable swing-up steps 104, 105 and stand-off tree cleats 102. The stand-off tree cleats 102 receive the swing arm 41 of the tree stand.

Once the climbing stick 100 is set with the foot 110 contacting the ground near a tree, a user can use stand-off tree cleats 102 and/or the swing-up steps 104, 105 to climb the climbing stick 100 up to the tree stand. The spacing of the stand-off tree cleats 102 and the swing-up steps 104, 105 may vary from the spacing shown in the drawings.

The climbing stick 100 can also be used to aid in the installation of a tree stand, for example, the tree stand shown in FIGS. 1-14d, on a tree by temporarily securing the stand prior to ratcheting or securing the stand to the tree with cables and/or straps.

FIGS. 20a-20d show a stand-off tree cleat 102. The stand-off tree cleat 102 is fastened to the stem section 101 of the climbing stick 100 by fasteners 106, 108. Strap termination brackets 109 are fastened to the stand-off tree cleats 102 for securing straps (not shown) to a tree.

FIGS. 18a-18c show a first rotatable swing-up step 104. The step 104 has a body 126 with a pivot point 120, a series of grooves 121 and an end tooth 122.

FIGS. 19a-19c show a second rotatable swing-up step 105, which is preferably a mirror image of the first rotatable swing-up step 104. The second rotatable swing-up step 105 has a body 127 with a pivot point 123, a series of grooves 124 and an end tooth 125. The rotatable swing-up steps 104, 105 are rotatable between a first position and a second position. In the first, open position, the body 126, 127 of the steps 104, 105 are perpendicular to the step portion 101 of the climbing stick 100. In the second, closed position, the body 126, 127 of the steps 104, 105 are parallel to the step portion 101 of the climbing stick 100.

Figure 17:
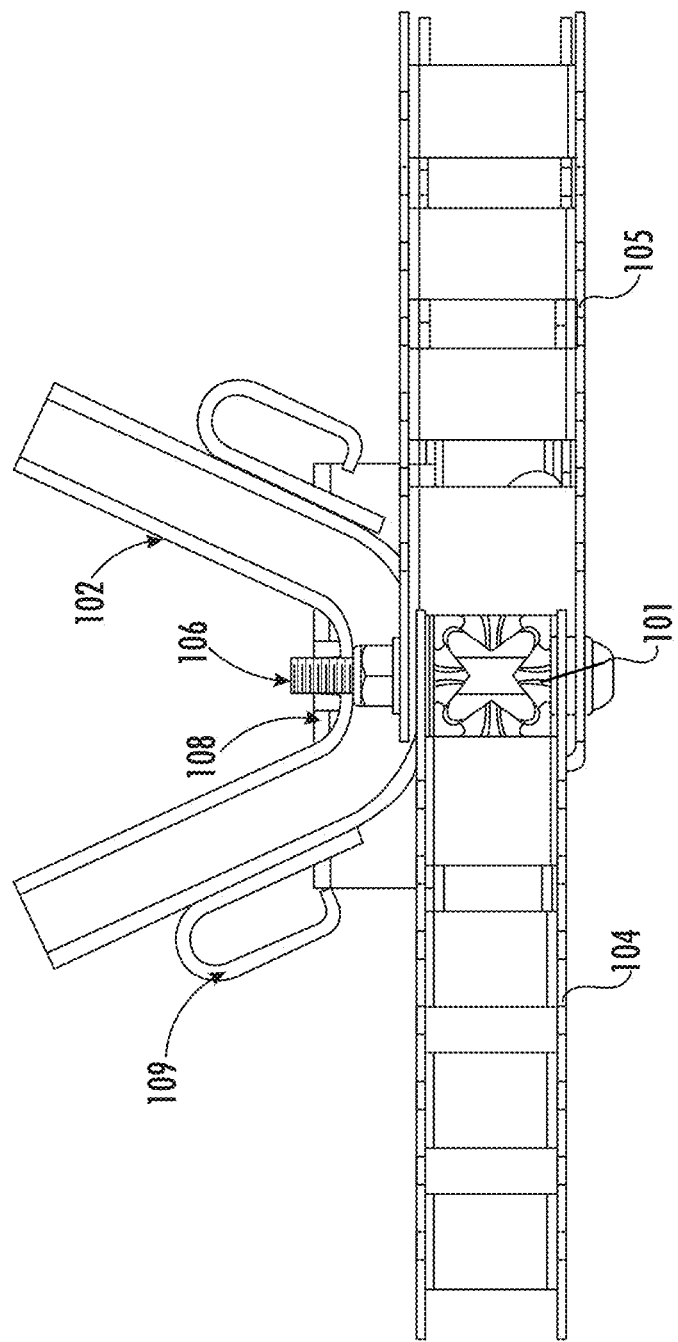
FIG. 17 shows a sectional view of the swing-up step.
Figure 20A:
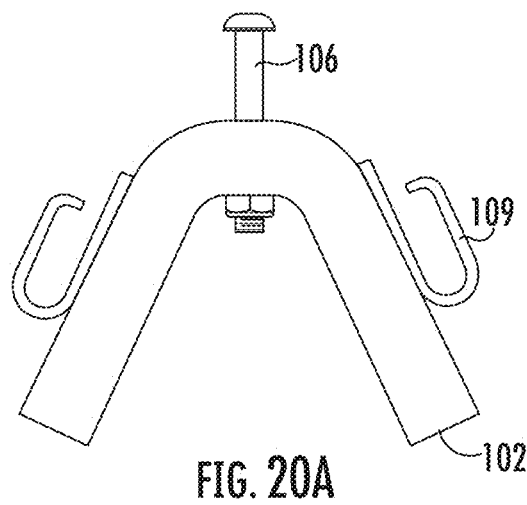
FIG. 20*a* shows a top view of a stand-off tree cleat with strap termination brackets.
Figure 20B:
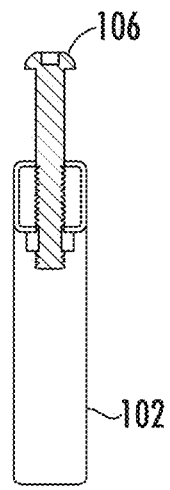
FIG. 20*b* shows a sectional view of a stand-off tree cleat with strap termination brackets.
Figure 20C:
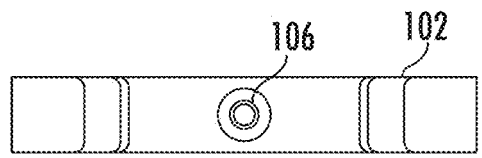
FIG. 20c shows a side view of a stand-off tree cleat with strap termination brackets.
Figure 20D:
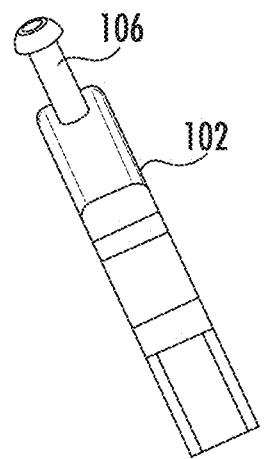
FIG. 20d shows a perspective view of a stand-off tree cleat with strap termination brackets.

FIG. 17 shows a top down sectional view of climbing stick with the steps 104, 105 in a first, open position.

In an alternate embodiment, the climbing stick can be altered to incorporate the swing-arm in multiple locations on the stem section of the climbing stick. The swing-arm could be designed to be integral to the climbing sticks or the tree stand. Nylon bushings may be used to dampen sound, and provide the ability to have a sliding receiver so the stand could be engaged/disengaged from the swing-arm.

To secure a tree stand to a tree with the aid of a climbing stick, the following steps would be carried out:

Step 301: At ground level, a first climbing stick with a foot 110 is placed on solid ground close to the tree, and the climbing stick is secured to the tree with a strap connected the strap termination bracket 109.

Step 302: A second climbing stick is attached to the first climbing stick by inserting the female receiver 111 of the first climbing stick into the second end 101b of a second climbing stick. The climbing stick is secured to the tree with a strap connected to the strap termination bracket 109 of the climbing stick.

Step 303: Repeat steps 301 and 302 until the desired number of climbing sticks are installed, extending a height for attaching a tree stand to a tree, ending with a climbing stick containing stand-off tree cleats 102.

Step 304: Inserting a first end 50a of a swingarm 41 into the stand off tree cleat 102 of the climbing stick. An additional tube extender 54 may be present on the male fitting 50a between the swing arm 41 and the stand off tree cleat 102.

Step 305: Pulling a tree stand up the tree with a rope and securing the second end 50b of the swing arm 41 to the tree stand.

Step 306: Securing the tree stand to the tree using straps 43 and cam plate 15.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tree stand for removable attachment to a tree using straps, comprising:
  a pivot cross support having a first pivot cross support end and a second pivot cross support end;
  a first pivot support bracket attached to the first pivot cross support end of the pivot cross support;
  a second pivot support bracket attached to the second pivot cross support end of the pivot cross support;
  a seat pivotably mounted to the first pivot support bracket and the second pivot support bracket;
  a first tubular bracket having a first end connected to the pivot cross support and a second end;
  a second tubular bracket, parallel to the first tubular bracket, having a first end connected to the pivot cross support and a second end; and
  wherein, the first tubular bracket and the second tubular bracket are located between the first pivot cross support end and the second pivot cross support end; and
  a platform pivot bracket mounted to and extending perpendicular relative to the second end of the first tubular bracket and the second end of the second tubular bracket, the platform pivot bracket having a body defining a pivot point at an end distal from the first tubular bracket and the second tubular bracket and a bent edge adjacent the first tubular bracket and the second tubular bracket, such that the pivot point is spaced radially outward from the first tubular bracket and the second tubular bracket;
  a pivotable lower platform defined by an outside support rail, at least one support bar, and a grate; wherein said pivotable lower platform is pivotably mounted to the platform pivot bracket via the pivot point;
  a pair of cables connecting the lower platform to the first tubular bracket and the second tubular bracket;
  wherein the bent edge of the platform pivot bracket interacts with the outside support rail of the lower platform, such that the platform pivot bracket acts as a cantilever for the lower platform, cantilevering the lower platform outward relative to the first tubular bracket and the second tubular bracket preventing the lower platform of the tree stand from moving from a horizontal position relative to the tree to a vertical position relative to the tree if the pair of cables break.

2. The tree stand of claim 1, wherein each of the first tubular bracket and the second tubular bracket further comprise a receiver for a swing-arm.

3. A tree stand system for removable attachment to a tree, comprising:
  a removable tree stand comprising:
  a pivot cross support having a first pivot cross support end and a second pivot cross support end;
  a first pivot support bracket attached to the first pivot cross support end of the pivot cross support;
  a second pivot support bracket attached to the second pivot cross support end of the pivot cross support;
  a seat pivotably mounted to the first pivot support bracket and the second pivot support bracket;
  a first tubular bracket having a first end connected to the pivot cross support and a second end;
  a second tubular bracket, parallel to the first tubular bracket, having a first end connected to the pivot cross support and a second end; and
  wherein, the first tubular bracket and the second tubular bracket are located between the first pivot cross support end and the second pivot cross support end; and
  a platform pivot bracket mounted to and extending perpendicular relative to the second end of the first tubular bracket and the second end of the second tubular bracket, the platform pivot bracket having a body defining a pivot point at an end distal from the first tubular bracket and the second tubular bracket and a bent edge adjacent the first tubular bracket and the second tubular bracket, such that the pivot point is spaced radially outward from the first tubular bracket and the second tubular bracket;
  a pivotable lower platform defined by an outside support rail, at least one support bar, and a grate; wherein said pivotable lower platform is pivotably mounted to the platform pivot bracket via the pivot point;
  a pair of cables connecting the lower platform to the first tubular bracket and the second tubular bracket; wherein the bent edge of the platform pivot bracket interacts with the outside support rail of the lower platform, such that the platform pivot bracket acts as a cantilever for the lower platform, cantilevering the lower platform outward relative to the first tubular bracket and the second tubular bracket, preventing the lower platform of the tree stand from moving from a horizontal position relative to the tree to a vertical position relative to the tree if the pair of cables break; and a climbing stick for aiding in installing the removable tree stand on a tree, comprising:

a stem portion having a first end, a second end and a length between the first end and the second end;

a female receiver for coupling to the tree stand mounted on the first end of the stem portion;

a removable foot coupled to the second end of the stem portion and perpendicular to the length of the stem portion; and a plurality of swing-up steps rotatably coupled to the length of the stem portion.

4. The tree stand of claim 1, wherein each of the first tubular bracket and the second tubular bracket further comprise a receiver for a swing-arm.

5. The tree stand of claim 3, wherein the length of the stem portion is between 16 and 21 feet.

6. The tree stand of claim 3, wherein each of the plurality of swing-up steps comprises a body having a pivot point, a series of teeth and an end tooth.

7. The tree stand of claim 3, wherein each of the plurality of swing-up steps is rotatably movable between a first position in which the step is parallel to the stem portion of the climbing stick and a second position in which the step is perpendicular to the stem portion of the climbing stick.

8. The tree stand of claim 3, further comprising a plurality of cleat foot holds coupled to the climbing stick along the length of the stem portion between the plurality of swing-up steps.

* * * * *